United States Patent [19]

Osman et al.

[11] Patent Number: 4,647,925
[45] Date of Patent: Mar. 3, 1987

[54] CIRCUIT EMPLOYING INTERCOUPLED STATE MACHINES FOR TRANSMITTING AND RECEIVING MULTIFORMATTED SEQUENCES OF VOICE AND DATA CHARACTERS

[75] Inventors: Fazil I. Osman, Escondido; Ralph O. Wickwire, San Diego, both of Calif.

[73] Assignee: Burroughs Corporation, Detroit, Mich.

[21] Appl. No.: 749,950

[22] Filed: Jun. 26, 1985

[51] Int. Cl.[4] .......................... H04Q 3/00; H04J 3/02; H04J 3/12
[52] U.S. Cl. .................................. 340/825.05; 370/85; 370/110.1
[58] Field of Search ................ 340/825.05; 370/110.1, 370/94, 89, 85; 377/81

[56] References Cited
U.S. PATENT DOCUMENTS

| | | | |
|---|---|---|---|
| 4,383,315 | 5/1983 | Torng | 370/89 |
| 4,450,554 | 5/1984 | Steensma et al. | 370/94 |
| 4,476,559 | 10/1984 | Brolin et al. | 370/110.1 |
| 4,581,735 | 4/1986 | Flamm et al. | 370/85 |

Primary Examiner—Ulysses Weldon
Assistant Examiner—Ralph E. Smith
Attorney, Agent, or Firm—Charles J. Fassbender; Kevin R. Peterson

[57] ABSTRACT

A circuit which operates on input signals representing multiformatted sequences of idle characters, voice characters, and data characters comprises: a first state machine consisting essentially of a logic array, a register, and a counter. One section of the register is coupled to receive the input signals and another section of the register together with the counter is coupled to receive respective signals from the logic array. The logic array has input terminals coupled to receive signals from the register and the counter, and in response, generate control signals indicating in which format and which location therein each character is being received. Second, third, and fourth state machines are coupled to receive respective subsets of the control signals from the first state machine. The second, third, and fourth state machines are adapted to perform transmit and receive operations on the voice and data characters in response to the subset of control signals it receives; and each subset of the control signals is smaller in number than the input terminals of the logic array.

11 Claims, 10 Drawing Figures

CIRCUIT EMPLOYING INTERCOUPLED STATE MACHINES FOR TRANSMITTING AND RECEIVING MULTIFORMATTED SEQUENCES OF VOICE AND DATA CHARACTERS

BACKGROUND OF THE INVENTION

This invention relates to circuits for transmitting and receiving information in a local area network.

Basically, a local area network is comprised of a plurality of stations in which the output terminals of one station connect to the input terminals of the net station. These connections are repeated for each station, and the output terminals of the last station connect to the input terminals of the first station to form a loop. Networks of this type are described, for example, in U.S. Pat. No. 4,519,070 by Bell and assigned to Burroughs Corporation.

In operation, signals are transmitted from one station to the next station until they travel all the way around the loop. By this means, information can be sent from any one station on the loop to any other station on the loop. A feature of the present invention is that it provides a circuit which can be used in each station on the loop to transmit and receive both voice characters and data characters. Also, with the disclosed circuit, these characters can be transmitted and received in multiformatted sequences. Further, the disclosed circuit has a novel architecture which makes it small in size and quasi-repetitious in structure so it is suitable for integration on a single semiconductor chip.

BRIEF SUMMARY OF THE INVENTION

In accordance with the present invention, a circuit is provided which receives and operates on input signals representing multiformatted sequences of idle characters, voice characters, and data characters. This circuit is comprised of a first state machine which consists essentially of a logic array, a register, and a counter. One section of the register is coupled to receive the input signals and another section of the register together with the counter is coupled to receive respective signals from the logic array.

The logic array has input terminals coupled to receive output signals from the register and the counter. In response, the logic array generates control signals indicating in which format the characters are being received, location of each character in the format, and the meaning of selected characters in the format. Second, third, and fourth state machines are coupled to receive respective subsets of the control signals from the first state machine. The second, third, and fourth state machines are adapted to perform transmit and receive operations on the voice and data characters in response to the subset of control signals it receives; and the number of control signals in each subset is substantially smaller than the number of input terminals to the logic array.

BRIEF DESCRIPTION OF THE DRAWINGS

Various features and advantages of the invention are described in the Detailed Description in conjunction with the accompanying drawings wherein:

FIG. 2 illustrates the formats of an input signal which the FIG. 1 circuit receives and operates on;

DETAILED DESCRIPTION OF THE INVENTION

Figure 1:
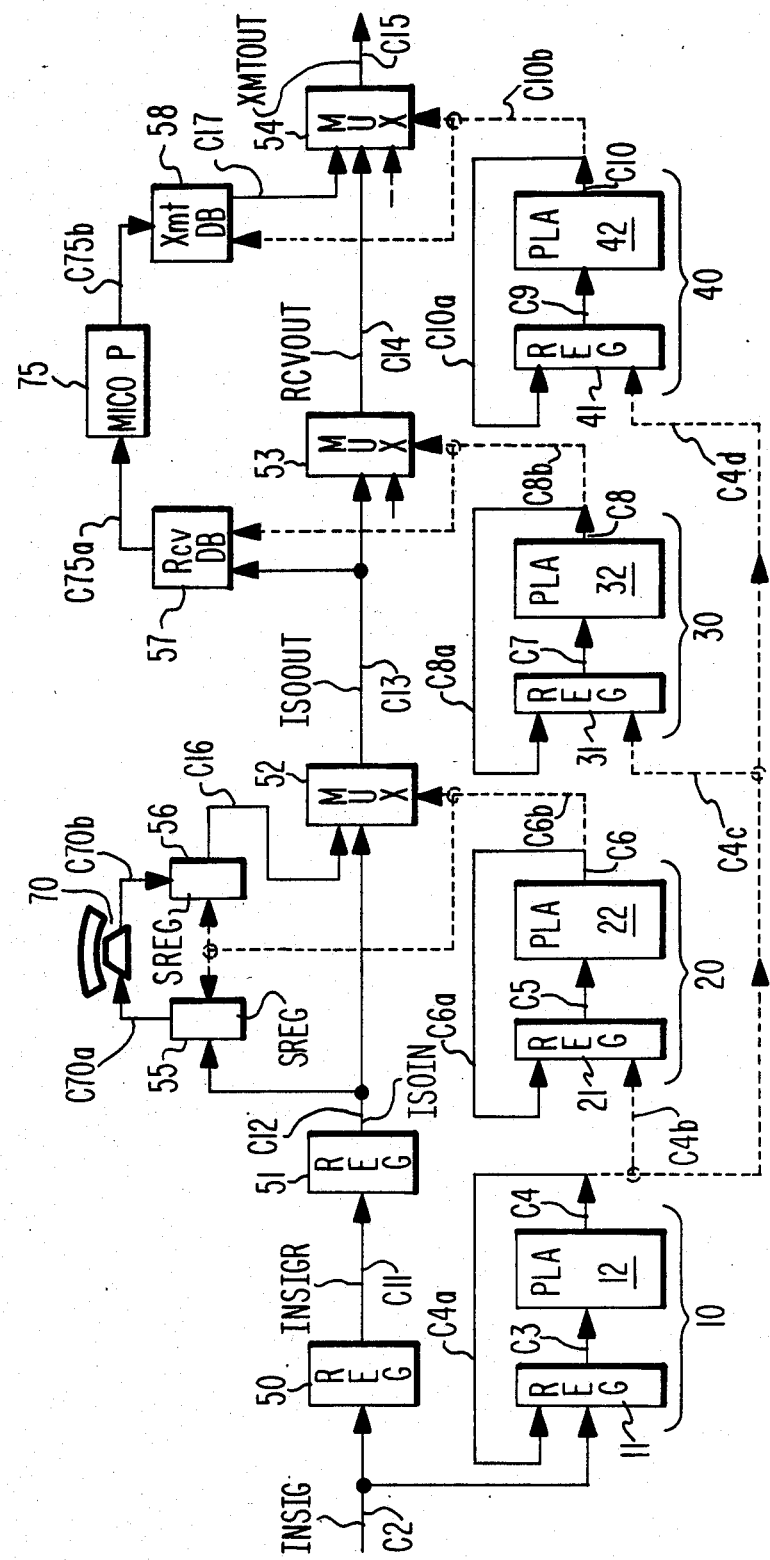
FIG. 1 illustrates the overall architecture of a circuit that is constructed in accordance with the invention.

Referring now to FIG. 1, the overall architecture of a circuit that is constructed in accordance with the invention will be described. This circuit includes four state machines 10, 20, 30, and 40. State machine 10 has an input register 11 and a programmable logic array (PLA) 12; state machine 20 has an input register 21 and a PLA 22; state machine 30 has an input register 31 and a PLA 32; and state machine 40 has an input register 41 and a PLA 42.

Conductors C2 through C10 intercouple the above registers and PLA's of the state machines. Specifically, conductors C2 carry input signals INSIG to register 11, and conductors C3 carry all the signals from register 11 to PLA 12. Control signals from PLA 12 are generated on conductors C4, and those signals on conductors C4a are coupled back to register 11.

Register 21 of state machine 2 receives control signals from a subset C4b of the conductors C4. All signals from register 21 are coupled via conductors C5 to PLA 22. Output signals from PLA 22 are generated on conductors C6, and those signals on conductors C6a are coupled from PLA 22 back to register 21.

Input register 31 of state machine 30 receives control signals from a subset C4c of the conductors C4. All signals from register 31 are coupled via conductors C17 to PLA 32. Output signals from PLA 32 are generated on conductors C8, and those signals on conductors C8a carry signals from PLA 32 back to register 31.

Register 41 of state machine 40 receives control signals from subset C4d of the conductors C4. All the signals from register 41 are coupled via conductors C9 to PLA 42. Conductors C10 carry output signals from PLA 42, and the signals on conductors C10a carry signals from PLA 42 back to register 41.

Also included in the FIG. 1 circuit are two registers 50 and 51, and three multiplexor circuits 52, 53, and 54. Conductors C2 carry the INSIG signals to register 50, and conductors C11 carry the output signals INSIGR from register 50 to register 51. Conductors C12 carry the output signals ISOIN from register 51 to multiplexor 52, and conductors C12 carry the output signals ISOOUT from multiplexor 52 to multiplexor 53. Conductors C14 carry the output signals RCVOUT from multiplexor 53 to multiplexor 54, and conductors C15 carry the output signals XMTOUT from multiplexor 54.

Further included in the FIG. 1 circuit is a parallel-serial register 55, a serial-parallel register 56, and two first-in-first-out (FIFO) type data buffers 57 and 58.

Output signals from register 51 are sent in parallel via the conductors C12 to register 55, while output signals from register 56 are sent in parallel via conductors C16 to multiplexor 52. Output signals from multiplexor 52 are sent in parallel via the conductors C13 to buffer 57, and output signals from buffer 58 are sent in parallel via conductors C17 to multiplexor 54.

A subset C6b of the C6 conductors from state machine 20 couple to control terminals on multiplexor 52, register 55, and register 56 to thereby control the operation of those components. A subset C8b of the C8 conductors from state machine 30 couple to control terminals on multiplexor 53 and data buffer 57 to thereby control the operation of those components. And a subset C10b of the C10 conductors from state machine 40 couple to multiplexor 54 and data buffer 58 to thereby control the operation of those components.

Figure 2:
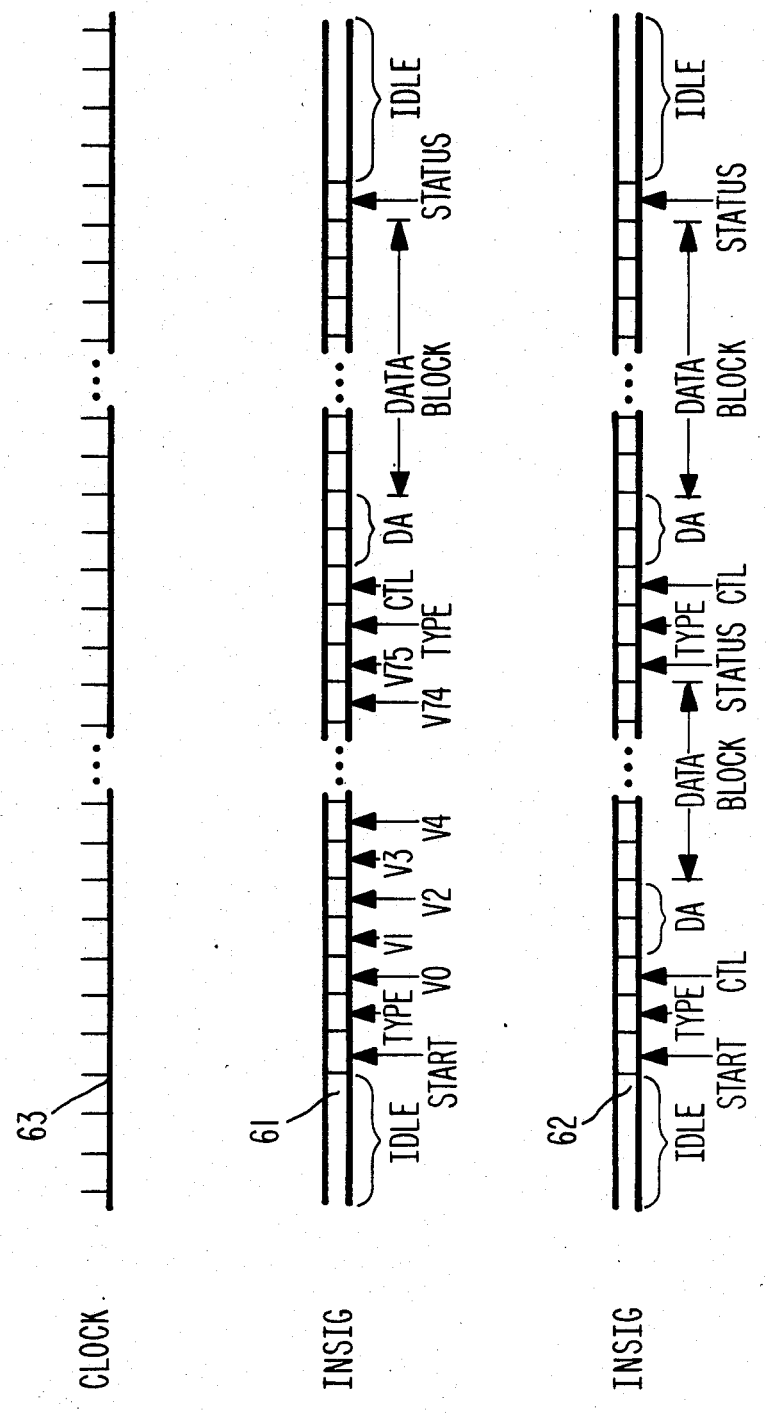

In operation, the INSIG signals representing sequences of IDLE characters, VOICE characters, and DATA characters are sent to the FIG. 1 circuit in two different formats. These signals occur on conductors C2 as they are illustrated in FIG. 2. Waveform 61 shows the first format for the IDLE, VOICE and DATA characters, while waveform 62 shows the second format of the IDLE, VOICE and DATA characters. All of the registers and data buffers in FIG. 1 also receive a CLOCK signal in synchronization with the IDLE and DATA signals as shown by waveform 63.

In the first format, the signal sequence begins with several IDLE characters which are followed by a START character with a TYPE character. This TYPE character has a predetermined value which indicates that it is followed by seventy-six voice channels. Each voice channel can contain a sampled data VOICE character of a different telephone conversation. Symbol V0 represents a VOICE character taken as a sample of one telephone conversation; symbol V1 indicates a VOICE character taken as a sample of another telephone conversation; etc.

Following VOICE character V75 is another TYPE character. It has two predetermined values both of which indicate that it is followed by a CONTROL character (CTL), a two-character DESTINATION ADDRESS (DA), a block of seventy-two DATA characters, and a STATUS character. This is then followed by a sequence of IDLE characters. One value of the TYPE character indicates the DATA block is full while another value indicates the DATA block is empty.

In the second format, the signal sequence begins with a sequence of IDLE characters which are followed by a START character and a TYPE character. This TYPE character has the same two values as the second TYPE character in waveform 61. It is followed by a CONTROL character, a two-character DESTINATION ADDRESS, a block of seventy-two DATA characters, and a STATUS character. Following that is another TYPE character with the same above two values followed by a CONTROL character, a DESTINATION ADDRESS of two characters, a block of seventy-two DATA characters, and a STATUS character. These are then followed by several IDLE characters.

As the input signal sequences INSIG of FIG. 2 are received in register 50, state machine 10 operates to generate control signals on the C4 conductors which indicate the particular format in which the characters are being received. Those control signals also indicate the location of each character in the format, and the meaning of selected characters in the format. From register 50, the input signal sequences sequentially pass through register 51, multiplexor 52, multiplexor 53 and multiplexor 54. As this occurs, state machines 20, 30, and 40 respond to the control signals on conductors C4b, C4c, and C4d by operating on the content of the input signal sequences.

In particular, state machine 20 selectively reads a VOICE character from one of the VOICE channels V0–V75 into register 55, and it writes a VOICE character from register 56 into one of the VOICE channels. State machine 30 selectively reads one of the DATA blocks into buffer 57. And state machine 40 writes the content of buffer 58 into one of the DATA blocks.

In accordance with the present invention, a network of several of the FIG. 1 circuits may be constructed by coupling the conductors C15 of one FIG. 1 circuit to the conductors C2 of another FIG. 1 circuit. Such coupling is repeated multiple times, and the conductors C15 of the last FIG. 1 circuit is coupled back to the conductors C2 of the first FIG. 1 circuit to form a loop. Any number of the FIG. 1 circuits may be included in such a network.

Preferably, in the above described network, the START character and all of the subsequent characters of waveforms 61 and 62 are sent around the loop in an isochronous fashion. That is, waveforms 61 and 62 are sent to register 50 at regular periodic intervals. By this means, a telephone conversation can be carried from one FIG. 1 circuit to another by each of the VOICE characters V0–V75.

Also preferably, the format of the signals which register 50 receives alternate in time between waveform 61 and waveform 62. During time periods in which there is a need to transmit both VOICE and DATA, format 61 is used; while during time periods in which there is a need to transmit only DATA, format 62 is used. By this means, the time allocated on conductors C11 through C15 for VOICE and DATA is more efficient than if only one format were used.

Figure 3:
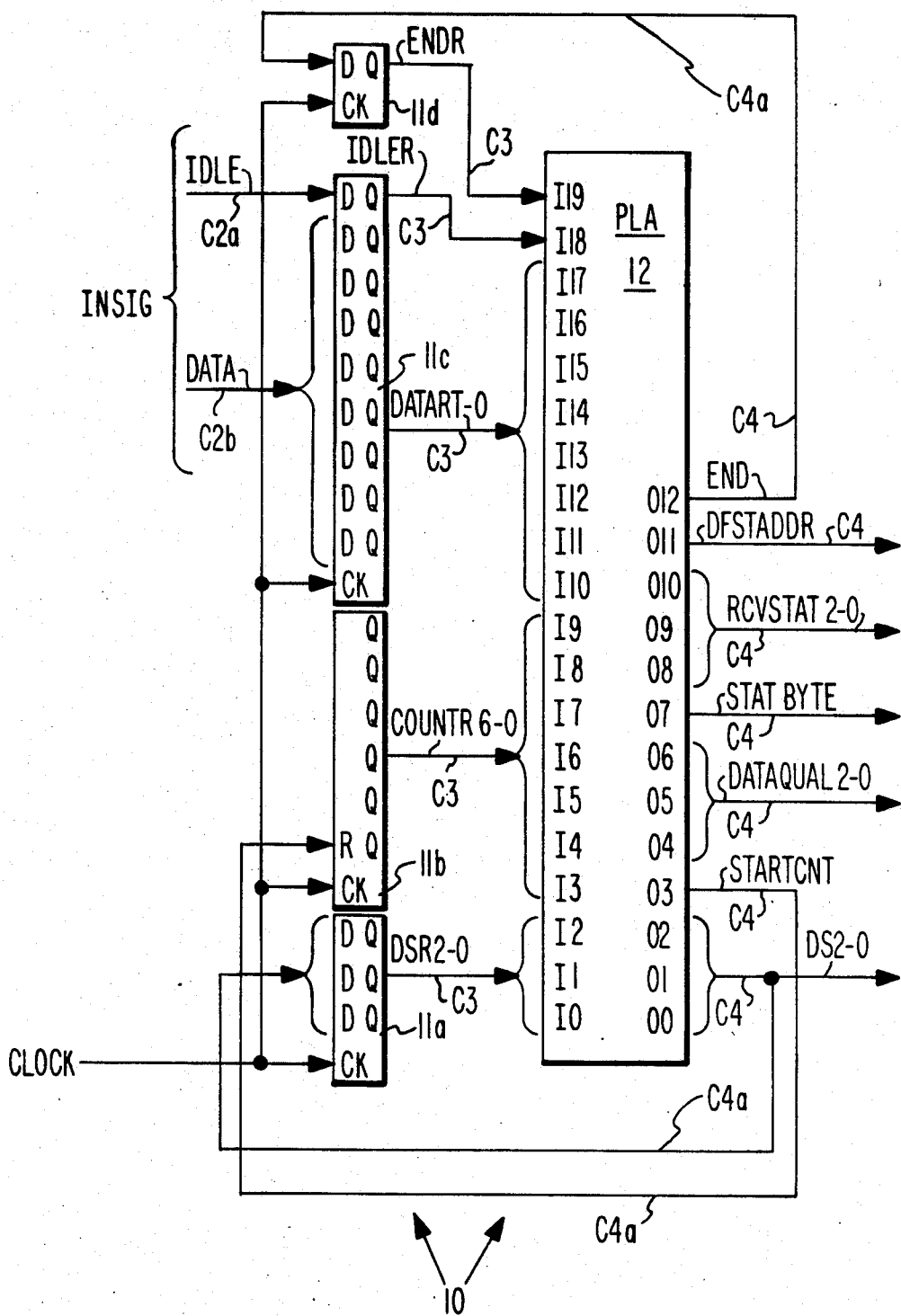
FIG. 3 is a detailed circuit diagram of a first state machine in the FIG. 1 circuit.

Turning now to FIG. 3, the details of state machine 10 will be described. As FIG. 3 shows, input register 11 has sections 11a, 11b, 11c, and 11d. Section 11a, is three-bit long D-type register which receives signals DS0 through DS2 from output terminal 00 through 02 of PLA 12. In turn, the output signals DSR0 through DSR2 from register 11a are coupled via a portion of the C3 conductors to input terminals I0 through I2 of PLA 12.

TABLE 1

| ENDR | IDLER | DATAR7-0 | COUNTR6-0 | DSR2-0 | END DESTADDR | RCVSTAT2-0 | STATBYTE | DATAQUAL2-0 | STARTCNT | DS2-0 | |
|---|---|---|---|---|---|---|---|---|---|---|---|
| 1 | ........ | ........ | ... | / | . | . | ... | . | ... | . | ..1 | T1 |
| 0 | ........ | ........ | 001 | / | . | . | ... | . | ... | . | .1. | T2 |

TABLE 1-continued

|   |   |          |         |     |   |   |   |   |   |   |   |   |   |   |     |     |
|---|---|----------|---------|-----|---|---|---|---|---|---|---|---|---|---|-----|-----|
| . | 0 | ........ | ........ | 010 | / | . | . | ... | . | ... | . | . | 11 | T3 |
| . | 0 | ........ | ........ | 011 | / | . | . | ... | . | ... | . | 1.. | T4 |
| 0 | 0 | ........ | ........ | 100 | / | . | . | ... | . | ... | . | 1.. | T5 |
| 1 | 0 | ........ | ........ | 100 | / | . | . | ... | . | ... | 1 | 1.1 | T6 |
| . | 0 | ........ | ........ | 101 | / | . | . | ... | . | ... | . | 11. | T7 |
| 0 | 0 | ........ | ........ | 110 | / | . | . | ... | . | ... | . | 11. | T8 |
| . | 0 | 10000000 | 1001011 | ... | / | . | . | ...1 | . | ... | . | ... | T9 |
| . | 0 | 11100110 | 1001011 | ... | / | . | . | .11 | . | ... | . | ... | T10 |
| . | 0 | 10111100 | 1001011 | ... | / | . | . | 11. | . | ... | . | ... | T11 |
| . | . | ........ | 1001011 | 100 | / | . | . | ... | 1 | ... | . | ... | T12 |
| . | . | ........ | 1001011 | 110 | / | . | . | ... | 1 | ... | . | ... | T13 |
| . | 0 | 10110011 | ........ | ... | / | . | . | ... | . | ...1 | . | ... | T14 |
| . | 0 | 11010101 | ........ | ... | / | . | . | ... | . | .11 | . | ... | T15 |
| . | 0 | 10001111 | ........ | ... | / | . | . | ... | . | 1.. | . | ... | T16 |
| . | . | ........ | 0000010 | ... | / | . | 1 | ... | . | ... | . | ... | T17 |
| . | . | ........ | 1001011 | ... | / | 1 | . | ... | . | ... | . | ... | T18 |

Section 11b of register 11 is a seven-bit long binary counter. It receives a STARTCNT signal from output terminal 03 of PLA 12 which initializes the counter to an all zero state. Thereafter, counter 11b counts upward in a binary fashion in sync with the CLOCK signal. Output signals COUNTR6-0 from counter 11b are sent via a portion of the conductors C3 to input terminals I3 through I9 of PLA 12.

Register section 11c is a nine-bit long D-type register. It receives the IDLE signal on conductor C2a and an eight-bit DATA signal on conductors C2b. Corresponding signals on the output terminals of register 11c, namely IDLER and DATAR, are sent via a portion of the C3 conductors to input terminals I10 through I18 of PLA 12.

Register section 11d is a single-bit D-type flip-flop. It receives an END signal from output terminal 012 of PLA 12. In turn, the output signal ENDR of flip-flop 11d is sent to input terminal I19 of PLA 12.

All of the signals from output terminal 00 through 012 of PLA 12 are generated from the signals on the PLA's input terminals I0 through I19. Table 1 above specifies the exact logic equations by which these output signals are generated. For example, entry T1 of Table 1 states that signals DS2-0 are forced to a binary one whenever signal IDLER is a one. Similarly, entry T2 states that signals DS2-0 are forced to a binary two whenever signals DSR2-0 equal a binary one and signal IDLER is a binary zero.

Figure 4:
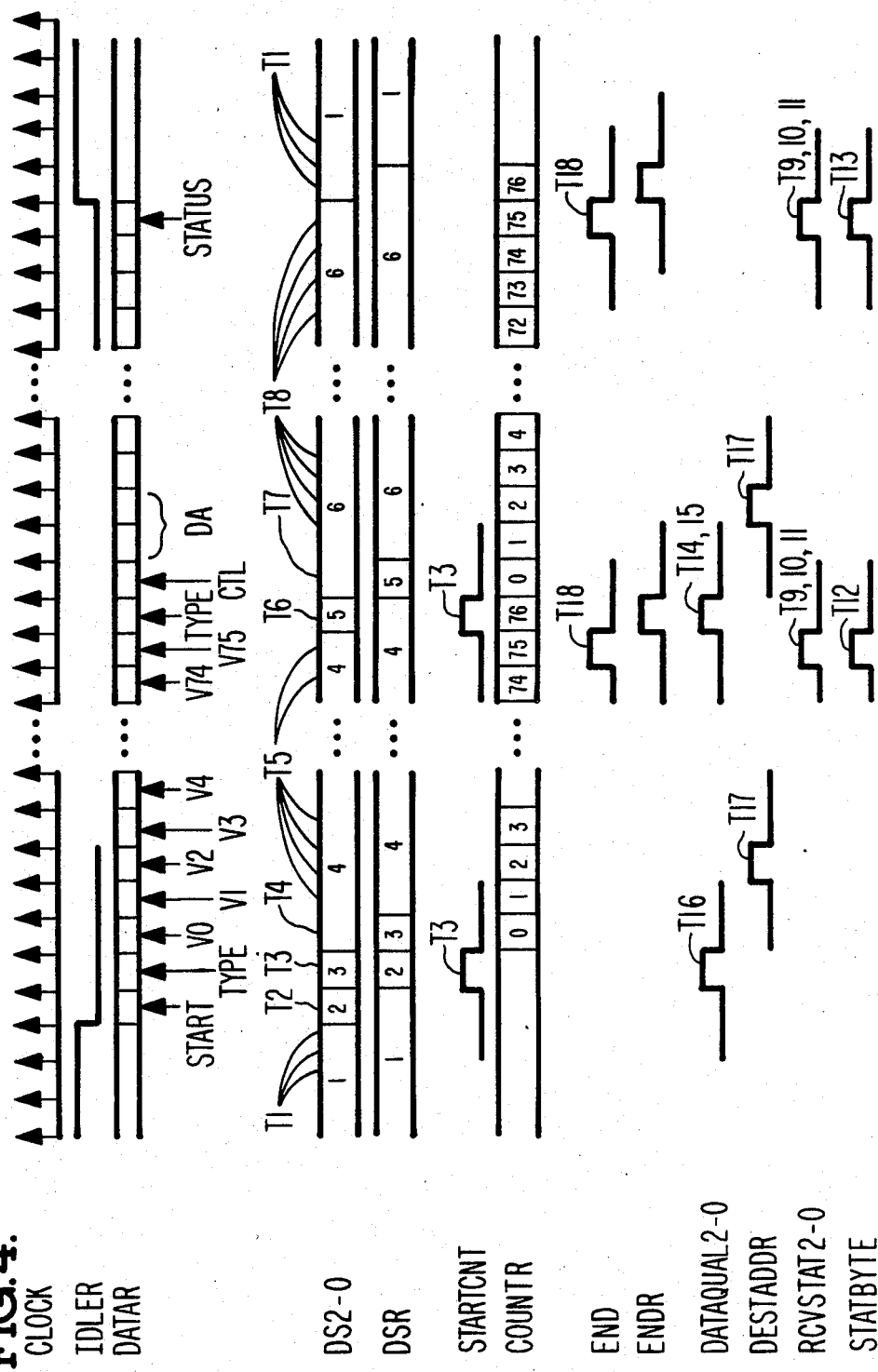
FIG. 4 is a set of waveforms which illustrate the operation of the FIG. 3 state machine.

All of the input signals to PLA 12 and the resulting output signals are shown in FIG. 4. In that figure, IDLE characters are initially received followed by a sequence of VOICE and DATA characters having the previously described format 61 of FIG. 2. When the IDLE characters are received, signals DS2-0 equal a binary one; and thereafter, as the VOICE and DATA characters are received, signals DS2-0 pass through binary states of two through six in the sequence illustrated.

Reference numerals T1 through T8 correlate the various portions of the DS2-0 waveforms to the particular entries in Table 1 which generate those waveforms' portions. For example, that portion of signals DS2-0 which is pointed to by reference numeral T1 in FIG. 4 is generated by entry T1 in Table 1. Similarly, that portion of signals DS2-0 which is pointed to by reference numeral T2 in FIG. 4 is generated by entry T2 in Table 1.

Entries T9 through T18 of Table 1 are also correlated in a similar fashion in FIG. 4 to the waveforms which they generate. For example, entry T12 generates the STATBYTE signal when DSR2-0 is a binary four and COUNTR6-0 is a binary seventy -five. Similarly, entry T10 generates the RCVSTAT2-0 signals as a binary three when COUNTR6-0 is a binary seventy-five and DATAR is a 11100110 and IDLER is a zero.

Terms T14, T15, and T16 generate the DATAQUAL2-0 signals with three different values. A binary one is generated if the TYPE character indicates an empty DATA block follows it; a binary three is generated if the TYPE character indicates a full DATA block follows it; and a binary four is generated if the TYPE character indicates VOICE characters follow it.

Also, terms T9, T10, and T11 generate the RCVSTAT2-0 signals with three different values. A binary one is generated if the STATUS character indicates the preceding DATA block is unreceived; a binary three is generated if the STATUS character indicates the preceding DATA block has been received; and a binary six is generated if the STATUS character indicates the preceding DATA block was inhibited from being received.

Figure 5:
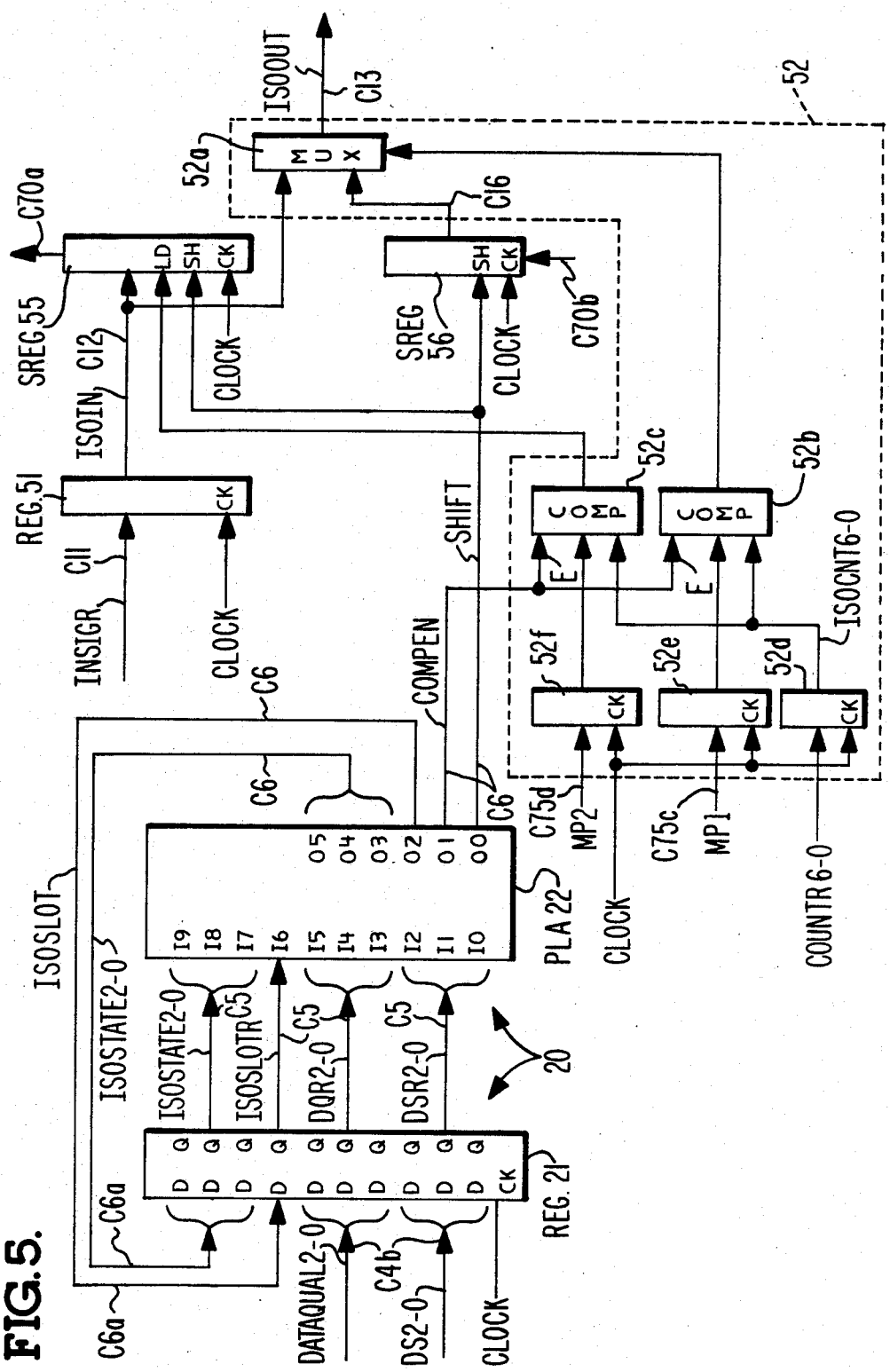
FIG. 5 is a detailed circuit diagram of a second state machine in the FIG. 1 circuit.

Next, with reference to FIG. 5, the details of state machine 20 and the circuits which it controls will be described. Input register 21 of state machine 20 is a ten-bit long long D-type register. Six of the input terminals of register 21 are coupled via conductors C4b to receive control signals DS2-0 and DATAQUAL2-0 from state machine 10. All ten of the output terminals of register 21 are coupled via conductors C5 to input terminals I0 through I9 of PLA 22.

PLA 22 has six output terminals 00 through 05. Terminals 03 through 05 are coupled via the C6a conductors to three of the input terminals of register 21. They carry signals ISOSTATE2-0 which define the state of state machine 20.

A SHIFT signal form output terminal 00 of PLA 22 is coupled to a shift control input of registers 55 and 56. When the SHIFT signal is true, register 55 and 56 shift their contents in response to the CLOCK signal. Signals that are shifted from register 55 go to a telephone 70 on a conductor C70a, and signals shifted into register 56 come from telephone 70 on a conductor C70b.

Output terminal 01 of PLA 22 generates a COMPEN signal which is sent to multiplexor circuit 52. Circuit 52 is comprised of a multiplexor 52a, a pair of comparators 52b and 52c, and three D-type registers 52d, 52e, and 52f. Signal COMPEN from PLA 22 is coupled to an enable input terminal E of comparators 52b and 52c.

When the COMPEN signal is true, both of the comparators 52b and 52c are enabled to operate.

Comparator 52b compares the contents of register 52d to the contents of register 52e. Register 52d holds the COUNTR6-0 signals, and register 52e holds a command MP1 that it received on conductors C75c from a microprocessor 75. Command MP1 identifies the channel of the VOICE character that is to be written. If the contents of registers 52d and 52e are equal, comparator 52b sends a signal to multiplexor 52a which causes the content of register 56 to pass through the multiplexor onto conductors C13. By this means, an isochronous write of a VOICE character into format 61 is achieved.

Comparator 52c operates to compare the contents of registers 52d and 52f. A command MP2 from microprocessor 75, which identifies the position of the VOICE character that is to be read, is sent on conductors C75d to register 32f. If the contents of registers 52d and 52f are equal, comparator 52c sends a signal to register 55 which causes the contents of register 51 to be loaded into register 55 in synchronization with the CLOCK signal. By this means, an isochronous read of a VOICE character in format 61 is achieved.

Table 2 as given below states the logic equations by which the signals on all of the output terminals 00 through 05 of PLA 22 are generated in response to the PLA's input signals. For example, entry I1 states that the ISOSLOT signal from PLA 22 is forced to a one when the DSR2-0 signals equal a binary three and the DQR2-0 signals equal a binary four. Similarly, entry I2 states that the COMPEN signal is forced to a one when the DSR2-0 signals equal a binary four and the ISOSLOTR signal is a one.

TABLE 2

| ISOSTATER-0 | | | | ISOSTATER2-0 | | | |
| ISOLOTR | | | | . | ISOSLOT | | |
| . | DQR2-0 | | | . | . | COMPEN | |
| . | . | DSR2-0 | | . | . | . | SHIFT |
| . | . | . | . | . | . | . | . |
| ... . | 100 | 011 | / | ... | 1 | . | . | I1 |
| ... 1 | ... | 100 | / | ... | 1 | 1 | . | I2 |
| ... 1 | ... | 101 | / | 111 | . | . | 1 | I3 |
| 111 . | ... | 110 | / | 11. | . | . | 1 | I4 |
| 110 . | ... | 110 | / | 1.1 | . | . | 1 | I5 |
| 101 . | ... | 110 | / | 1.. | . | . | 1 | I6 |
| 100 . | ... | 110 | / | .11 | . | . | 1 | I7 |
| 011 . | ... | 110 | / | .1. | . | . | 1 | I8 |
| 010 . | ... | 110 | / | ..1 | . | . | 1 | I9 |
| 001 . | ... | 110 | / | ... | . | . | 1 | I10 |

Figure 6:
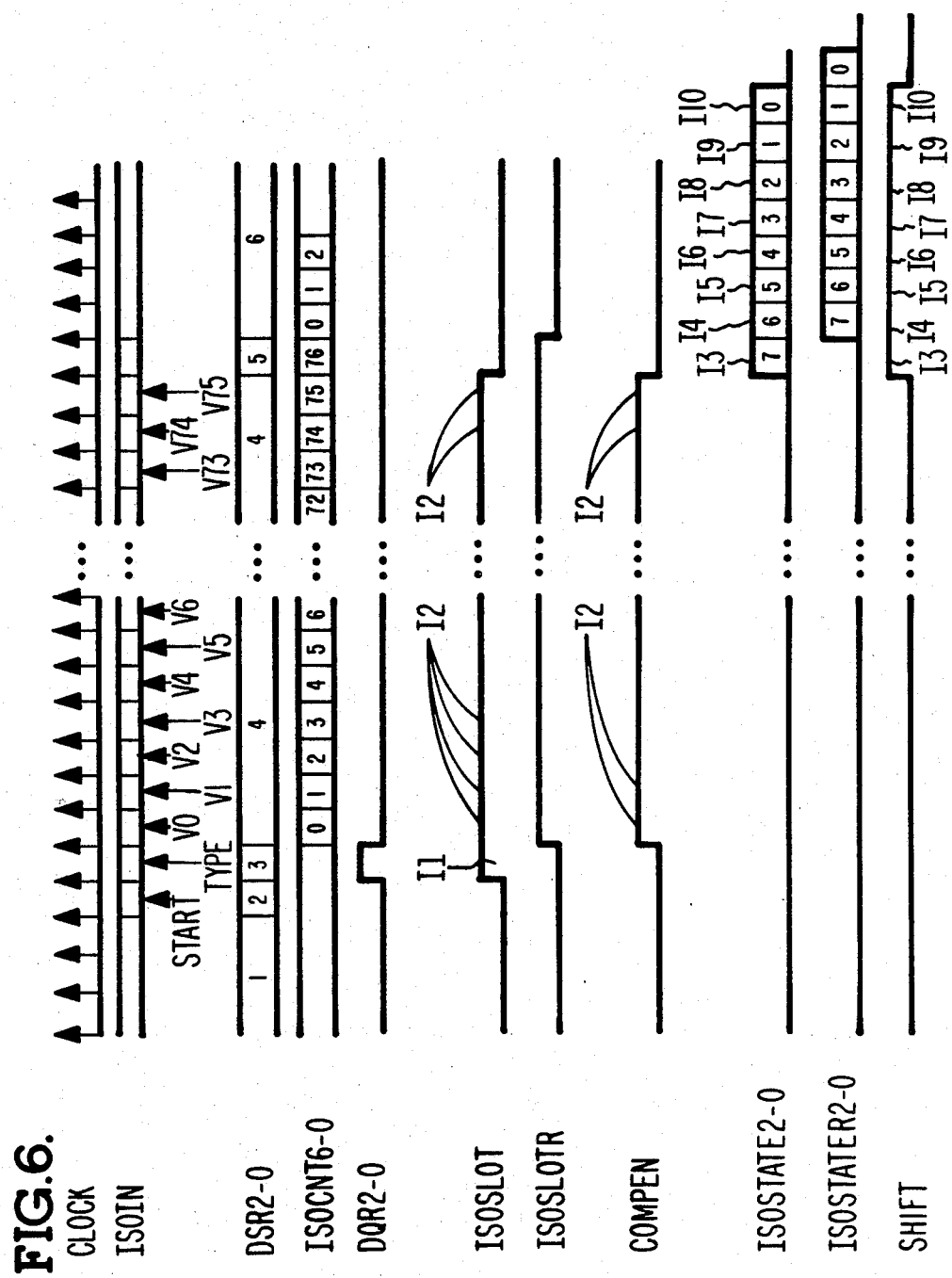
FIG. 6 is a set of waveforms which illustrate the operation of the FIG. 5 state machine.

All of the input signals and output signals of PLA 22, along with the ISOIN signal from register 51, are shown in FIG. 6. In this figure, reference numerals I1 through I10 correlate various portions of the illustrated waveforms to the entries in Table 2 which produce the corresponding waveform portions. For example, reference numeral I1 in FIG. 6 shows that the rising edge of the ISOSLOT signal is produced by entry I1 in Table 2. Similarly, reference numerals I3 through I10 in FIG. 6 show that the one state of the SHIFT signal is produced by entries I3 through I10 in Table 2.

Figure 7:
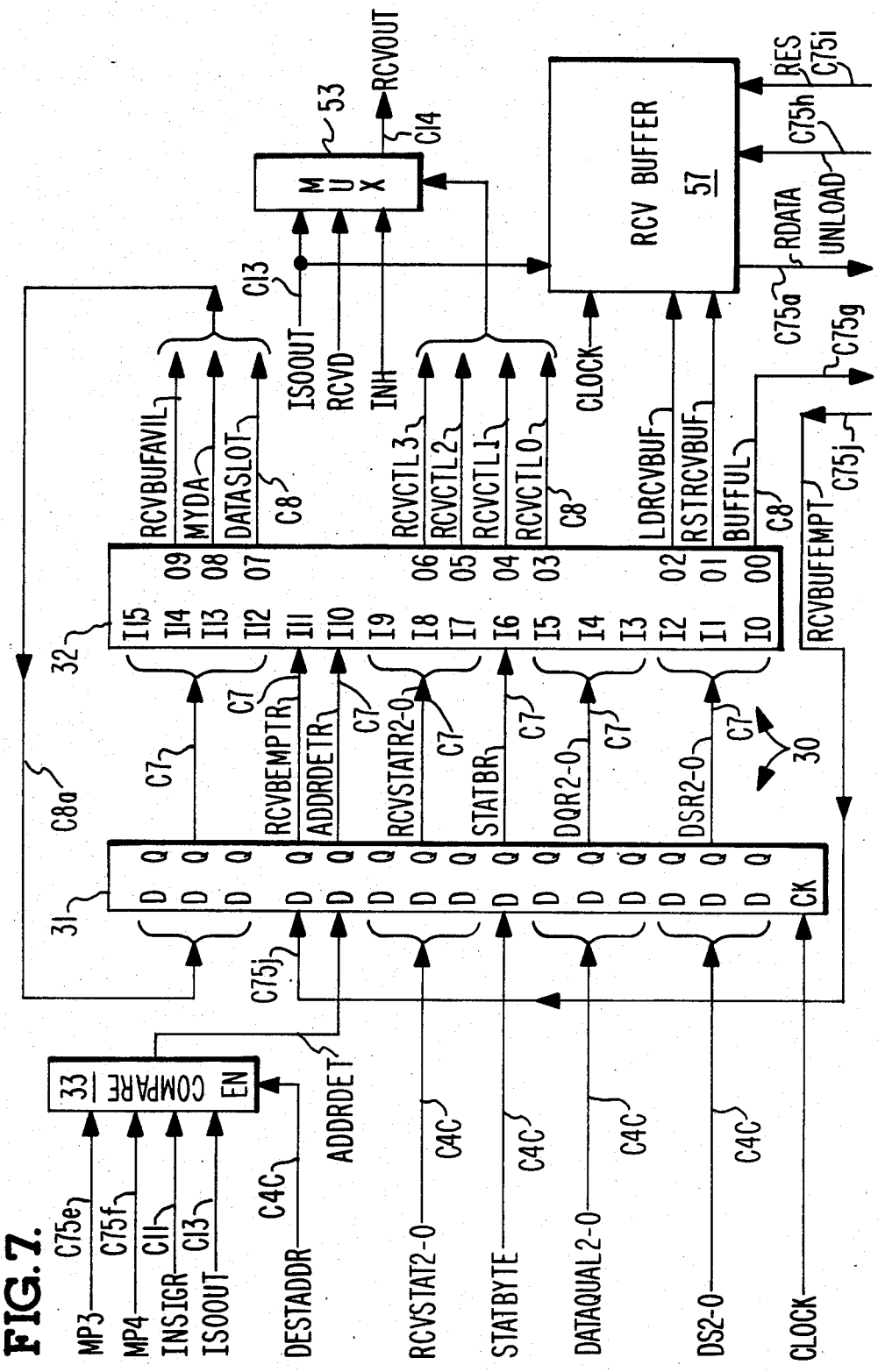
FIG. 7 is a detailed circuit diagram of a third state machine in the FIG. 1 circuit.
Figure 8:
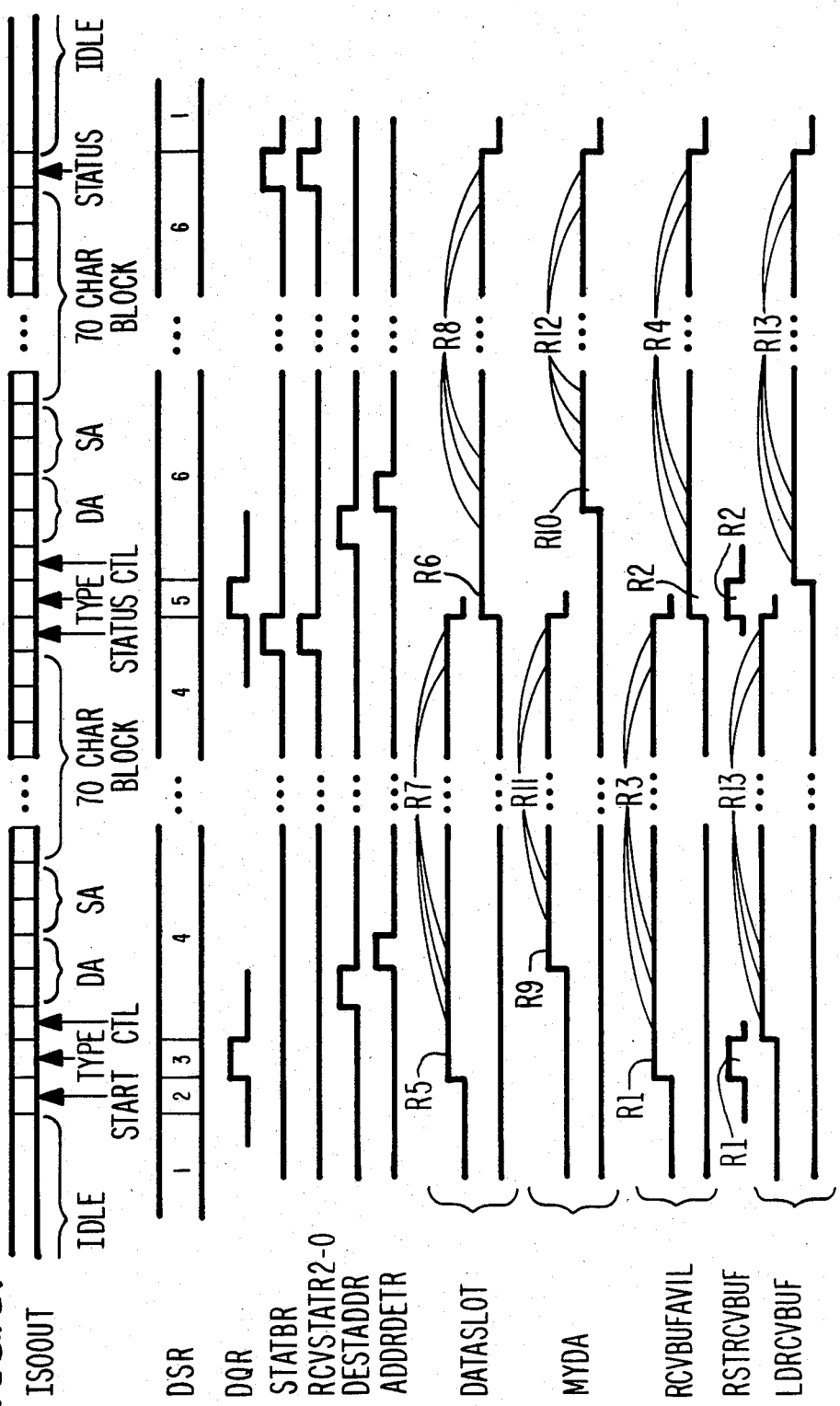
FIG. 8 is a set of waveforms which illustrate the operation of the FIG. 7 state machine.

Reference should next be made to FIGS. 7 and 8 wherein details of the circuitry of state machine 30 along with its operation are illustrated. Input register 31 of state machine 30 is a fifteen-bit long D-type register. Ten of the input terminals of register 31 receive control signals from state machine 10 on the conductors C4c. Those signals are DS2-0, DATAQUAL2-0, STATBYTE, and RCVSTAT2-0.

Another signal DESTADDR on the C4c conductors goes to the enable input terminal of a comparator 33. When the comparator is enabled, it compares the DATAR signals and the ISOOUT signals respectively to a pair of commands MP3 and MP4 from microprocessor 75 on conductors C75e and C75f. If both comparisons are equal, comparator 33 generates an ADDRDET signal which is sent to an input terminal of register 31.

All of the output signals from register 31 are coupled via the conductors C7 to respective input terminals I0 through I15 of PLA 32. In response to the signals on its input terminals, PLA 32 generates ten signals on its output terminals 00 through 09. Those signals on terminals 07 through 09 define the state of state machine 30, and they are coupled via the conductors C8a back to three of the input terminals of register 31.

PLA 32 also generates a BUFFUL signal on output terminal 00, a RSTRCVBUF signal on output terminal 01, and a LDRCVBUF signal on output terminal 02. When the signal on output terminal 01 is true, it resets buffer 57. When the signal on output terminal 02 is true, buffer 57 loads the ISOOUT signals on the C13 conductors in synchronization with the CLOCK signal. After buffer 57 is full, the signal on output terminal 00 is generated and sent via a conductor C75g to microprocessor 75.

Signals on conductors C75a, C75h and C75i provide the means for microprocessor 75 to unload buffer 57. Conductors C75a carry the actual data from buffer 57; conductor C75h carries and UNLOAD signal which causes the next character in buffer 57 to be generated on the C75a conductor; and an RES signal on conductor C75i causes buffer 57 to be reset. One other conductor C75j from microprocessor 75 carries an RCVBUFEMPT signal to an input terminal of register 31 which by its true state indicates when buffer 57 is empty.

PLA 32 also generates signals RCVCTL0 3-0 on its output terminals. Those signals are sent to multiplexor 53 to select which signals pass through it. Multiplexor 53 has input terminals the ISOOUT signals on the C13 conductors, a STATUS character RCVD which indicates that a block of DATA characters has been received in buffer 57, and another STATUS character INH which indicates that a block of DATA characters has been inhibited from being received because buffer 57 was full.

Many of the input signals and output signals of PLA 32 are shown in FIG. 8, and Table 3 as given below states the logic equations which generate those output signals. Reference numerals R1 through R14 identify the entries in Table 3. And, those same reference numerals in FIG. 8 correlate portions of the FIG. 8 waveforms to the entries in Table 3 which generate them.

Entries R1 through R4 in Table 3 generate the RCVBUFAVAIL signal; entries R5 through R8 generate the DATASLOT signal; and entries R9 through R13 generate the MYDA signal. Those signals occur as drawn in the left half of FIG. 8 when the first DATA Block of format 62 is received by buffer 57. Those same signals occur as drawn in the right half of FIG. 8 when the last DATA block of format 62 or the single DATA block of format 61 is received by buffer 57.

TABLE 3

```
RCVBUFAVAILR                                      RCVBUFAVAIL
. MYDAR                                           . MYDA
. . DATASLOTR                                     . . DATASLOT
. . . RCVBEMPTR                                   . . . RCVCTL3-0
. . . . ADDRDETR                                  . . . .
. . . . . RCVSTATR2-0                             . . . . LDRCVBUF
. . . . . . STATBR                                . . . . . RSTRCVBUF
. . . . . . . DQR2-0                              . . . . . . BUFFUL
. . . . . . . . DSR2-0                            . . . . . . .
───────────────────────────────────────────────────────────────────
. . . 1 ... . ...     011   / 1 . . ....   . 1 .      R1
. . . 1 ... . ...     101   / 1 . . ....   . 1 .      R2
1 . . . ... . ...     100   / 1 . . ....   . . .      R3
1 . . . ... . ...     110   / 1 . . ....   . . .      R4
. . . . ... . 011     011   / . . 1 ....   . . .      R5
. . . . ... . 011     101   / . . 1 ....   . . .      R6
. . 1 . ... . ...     100   / . . 1 ....   . . .      R7
. . 1 . ... . ...     110   / . . 1 ....   . . .      R8
. . . 1 ... . ...     100   / . 1 . ....   . . .      R9
. . . 1 ... . ...     110   / . 1 . ....   . . .      R10
. 1 . . ... . ...     100   / . 1 . ....   . . .      R11
. 1 . . ... . ...     110   / . 1 . ....   . . .      R12
1 . 1 . ... . ... ...       / . . . ....   1 . .      R13
1 1 1 . 001 1 ... ...       / . . . ...   1 . 1       R14
0 1 1 . 001 1 ... ...       / . . . 11..   . . .      R15
```

After a block of DATA is loaded into buffer 57, entry R14 of Table 3 changes the STATUS character to RCVD. However, if the block of DATA cannot be received because buffer 57 was full, entry R15 of Table 3 changes the STATUS character to INH.

Figure 9:
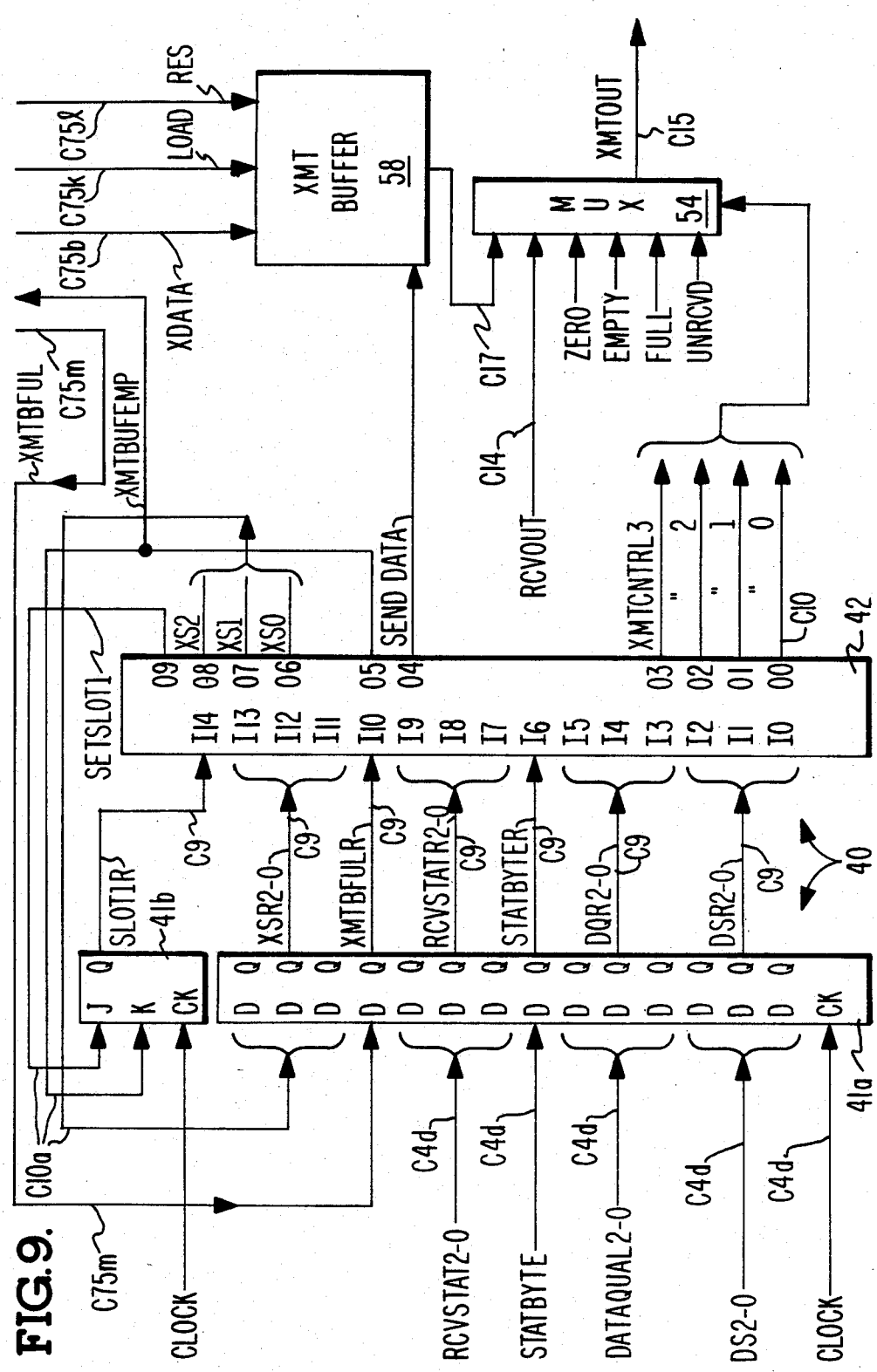
FIG. 9 is a detailed circuit diagram of a fourth state machine in the FIG. 1 circuit.

Next, with reference to FIGS. 9 and 10, all of the details of state machine 40 will be described. As FIG. 9 shows, input register 41 is made of a fourteen-bit D-type register 41a and a JK flip-flop 41b. Ten of the input terminals of register 41a are coupled via the C4d conductors to receive control signals from state machine 10. Those control signals are DS2-0, DATAQUAL2-0, STATBYTE, and RCVSTAT2-0.

All of the output signals from registers 41a and 41b are sent via the C9 conductors to input terminals I0 through I14 of PLA 42. In response thereto, PLA 42 generates ten output signals on its output terminals 00 through 09. Signals XMTBUFEMPT, XS2-0, and SETSLOT1 are generated by PLA 42 on output terminals 05 through 09, and they indicate the state of state machine 40. Those signals are fed back via the C10a conductors to input registers 41a and 41b.

Output terminals 00 through 03 of PLA 42 generate signals XMTCNTRL3-0. Those signals are sent to multiplexor 54 to select which of the multiplexor's input signals pass to the C15 conductors. Signals which multiplexor 54 passes to the C15 conductors are the XDATA signals from buffer 58, the RCVOUT signals on conductors C14, a zero DATA character, and empty TYPE character, a full DATA character, and an unreceived STATUS character.

State machine 40 utilizes the zero DATA character to zero fill a data block. It is sent through multiplexor 54 when XMTCNTRL3-0 equals 1100. The empty TYPE character is utilized to indicate that the immediately following data block of formats 61 and 62 is empty; and it is sent through multiplexor 54 when XMTCNTRL3-equals 0110. The full TYPE character is utilized to indicate that the immediately following data block in format 61 and 62 is filled wiht DATA; and it is sent through multiplexor 54 when XMTCNTRL3-0 equals 0010.

The unreceived STATUS character is utilized to indicate that the data block which immediately precedes the STATUS character in format 61 and 62 is unreceived; and it is sent through multiplexor 54 when XMTCNTRL3-0 equals 0100. Characters from buffer 58 are sent through multiplexor 54 when XMTCNTRL3-0 equals 0001; and RCVOUT is sent through multiplexor 54 when XMTCNTRL3-0 equals 0000.

Output terminal 04 of PLA 42 generates a SEND DATA control signal which is received by buffer 58. When SEND DATA is true, data in buffer 58 is sent to the C17 conductors in synchronization with the CLOCK signal. Buffer 58 also receives additional signals from microprocessor 75 on conductors C75b, C75k, and C75l. Buffer 58 is reset in response to a RES signal on conductor C75l. XDATA on the conductors C75b is written into buffer 58 in response to a LOAD signal on conductor C75k. To indicate that buffer 58 has been filled, microprocessor 75 sends an XMTBFUL signal on a conductor C75m to an input terminal of register 41a.

Table 4 as shown below lists all of the logic equations by which the signals on output terminals 00 through 09 of PLA 42 are generated. Entries in Table 4 are identified by reference numerals X1 through X20. For example, entry X2 states that signals XS2-0 is generated as a binary one when signals DSR2-0 equal a binary five and signals DQR2-0 equal a binary one and signal XMTBFULR is a one and signals XSR2-0 is a binary zero and signal SLOT1R is a zero

TABLE 4

| SLOT1R | | | | | | | SETSLOT1 | | | | |
|---|---|---|---|---|---|---|---|---|---|---|---|
| XSR2-0 | | | | | | | XS2-0 | | | | |
| | XMTBFULR | | | | | | | XMTBUFEMPT | | | |
| | | RCVSTATR2-0 | | | | | | | SENDDATA | | |
| | | | STATBYTER | | | | | | | | |
| | | | | DQR2-0 | | | | | | | |
| | | | | | DSR2-0 | | | | | XMTCNTR3-0 | |
| . 000 | 1 | ... | . | 001 | 011 | / 1 | ..1 | . | 1 | ..1. | X1 |
| 0 000 | 1 | ... | . | 001 | 101 | / . | ..1 | . | 1 | ..1. | X2 |
| . 001 | . | ... | . | ... | 100 | / . | ..1 | . | 1 | ...1 | X3 |
| . 001 | . | ... | 1 | ... | 100 | / . | ..1 | . | . | .1.. | X4 |
| . 001 | . | ... | . | ... | 110 | / . | ..1 | . | 1 | ...1 | X5 |
| . 001 | . | ... | 1 | ... | 110 | / . | ..1 | . | . | .1.. | X6 |
| 1 001 | . | ... | . | ... | 101 | / . | .1. | . | . | .... | X7 |
| 1 010 | . | ... | . | ... | 110 | / . | .1. | . | . | .... | X8 |
| . 001 | . | ... | . | ... | 001 | / . | .1. | . | . | .... | X9 |
| . 010 | . | ... | . | ... | 001 | / . | .1. | . | . | .... | X10 |
| . 010 | . | ... | . | ... | 010 | / . | .1. | . | . | .... | X11 |
| 0 010 | . | ... | . | ... | 011 | / . | .1. | . | . | .... | X12 |
| 1 010 | . | ... | . | 010 | 011 | / . | .11 | . | . | 011. | X13 |
| 0 010 | . | ... | . | ... | 100 | / . | .1. | . | . | .... | X14 |
| 0 010 | . | ... | . | 010 | 101 | / . | .11 | . | . | 011. | X15 |
| 1 011 | . | ... | . | ... | 100 | / . | .11 | . | . | 11.. | X16 |
| 0 011 | . | ... | . | ... | 110 | / . | .11 | . | . | 11.. | X17 |
| . 011 | . | 011 | 1 | ... | ... | / . | ... | 1 | . | .... | X18 |
| . 011 | . | 001 | 1 | ... | ... | / . | ... | 1 | . | .... | X19 |
| . 011 | . | 110 | 1 | ... | ... | / . | ... | 1 | . | .... | X20 |

Figure 10:
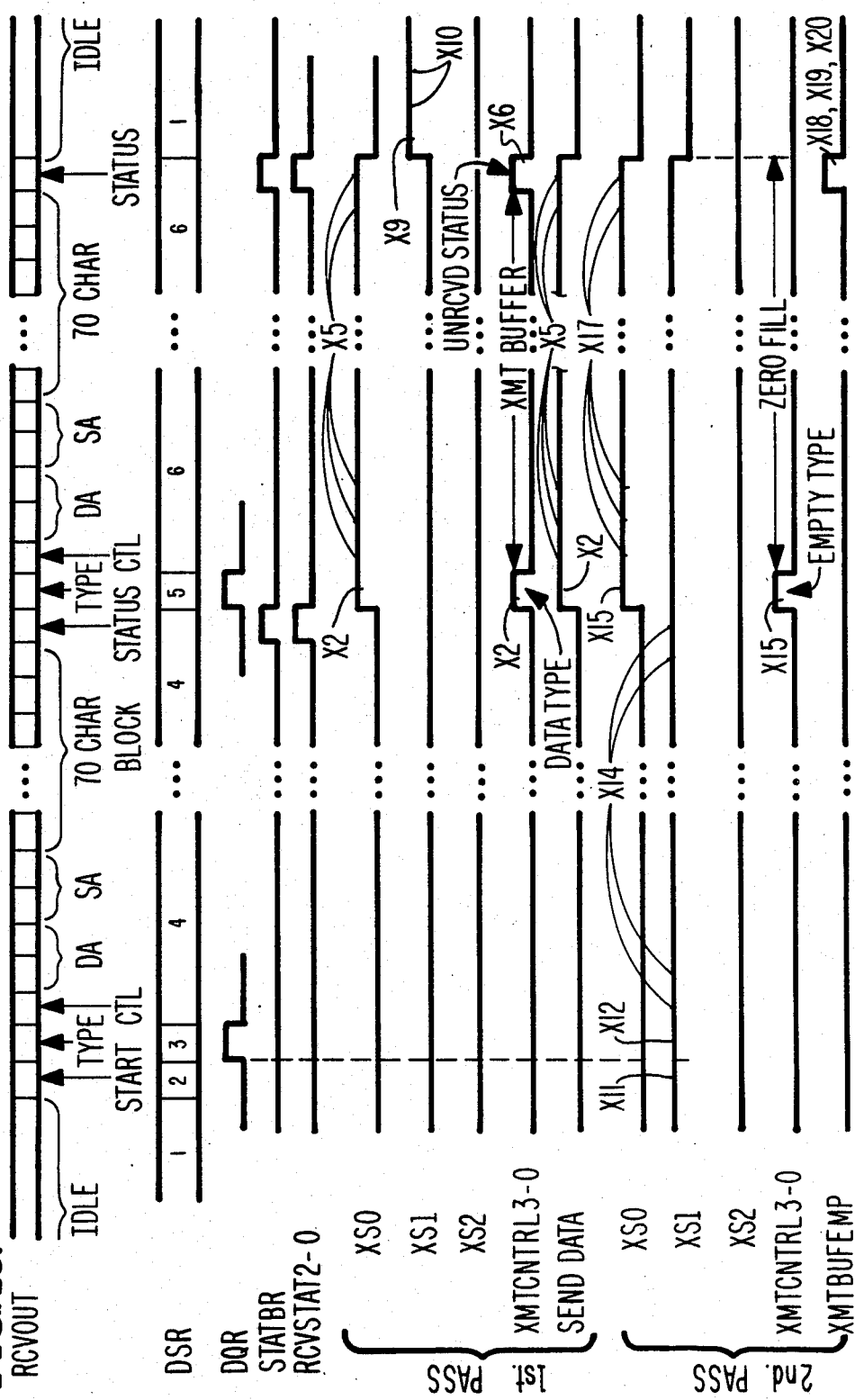
FIG. 10 is a set of waveforms which illustrate the operation of the FIG. 9 state machine.

Many of the signals from PLA 42 which Table 4 generates are illustrated in FIG. 10. In that figure, reference numerals X1 through X20 identify the portions of the signal waveforms that are generated by the corresponding entries in Table 4. For example, entry X2 in Table 4 generates the low to high transition of signal XS1 in FIG. 10; and entry X5 in Table b 4 keeps signal XS1 at a high level in FIG. 10 so long as signals DSR2-0 remain in state six.

When state machine 40 is in a quiescent state, signals XS2-0 equal a binary zero. This is illustrated in FIG. 10 by the left half portion of the signals labeled FIRST PASS. Thereafter, as state machine 40 transmits a DATA block from buffer 58 through multiplexor 54, the signals XS2-0 are set to a binary one. This is illustrated by the right half portion of the FIG. 10 signals which are labeled FIRST PASS. Also, as reference numeral X6 of those signals show, an unreceived STATUS character is written at the end of the transmitted DATA block.

After transmitting the STATUS character, signals XS2-0 are generated as binary two. This is indicated in FIG. 10 by reference numerals X9 and X10. State machine 40 remains in state two until the block of DATA which it transmitted passes all the way around a loop of the FIG. 1 circuits and back into the circuit which transmitted the DATA block. This is illustrated by the left half portion of the FIG. 10 waveforms which are labeled SECOND PASS.

When state machine 40 receives the block of DATA characters that it transmitted, signals XS2-0 are generated as a binary three. In that state, the TYPE character which preceded the transmitted DATA block is written as an empty TYPE character, and the DATA block itself is zero filled. This is indicated in FIG. 10 by the right half portion of the signals labeled SECOND PASS. After the zero filling operation is complete, a new STATUS character is written, and signals XS2-0 return to the all zero state.

A preferred embodiment of the invention has now been described in detail. One feature of this embodiment is that its architecture has a quasi-repetitive structure which makes it suitable for integration on a single semiconductor chip. In particular, state machines 10, 20, 30, and 40 are nearly identical except for the content of their respective PLA's.

Another feature of the above described invention is that the employment of concatenated state machines substantially reduces the size of the PLA's 22, 32, and 42 over that which would be required if they had to directly monitor the input signals INSIG. That task which involves determining the type of format, determining the location of the characters in the format, and interpreting the selected characters in the format, is performed by the first state machine 10.

To achieve that task, a total of twenty signals are sent to PLA 12 on the C3 conductor. By comparison, state machine 20 receives only six control signals on the C4b conductors from state machine 10 which indicate the format, location, and meaning of characters in the INSIG signals. Thus, the presence of state machine 10 reduces the number of signals of PLA 22 by a total of twenty minus six, or fourteen.

Likewise, state machine 30 receives only ten control signals on the C4c conductors from state machine 10 which indicates the format, location, and meaning of the various input signal characters. Thus, the presence of state machine 10 reduces the number of input signals to PLA 32 by a total of twenty minus ten, or ten.

Similarly, state machine 40 receives only ten signals on the C4d conductors from state machine 10 which indicates the format and location of the various INSIG characters. So the number of signals to PLA 42 is reduced by the presence of state machine 10 by a total of twenty minus ten, or ten.

In summary, the presence of state machine 10 reduces the total number of input signals to the other state machines by fourteen plus ten plus ten or thirty-four. This compares favorably to the twenty input signals which state machine 10 receives. Preferably, when using the disclosed two tier state machine architecture, the total reduction of input signals to the second tier of state machines is more than the number of input signals to the first state machine.

Many changes and modifications may be made to the details of the above described circuit without departing from the nature and spirit of the invention. Accordingly, it is to be understood that the invention is not limited to those details but is defined by the appended claims.

What is claimed is:

1. A circuit which operates on input signals representing multiformatted sequences of idle characters, voice characters, and data characters; said circuit comprising:

a first state machine means consisting essentially of a logic array, a register means, and a counter;

one section of said register means being coupled to receive said input signals in synchronization with a clock, another section of said register means together with said counter being coupled to receive respective signals from said logic array in synchronization with said clock, and each character of said sequences being defined by a state of said input signals when said clock occurs;

said logic array having input terminals coupled to receive output signals from said register means and said counter, and being adapted to generate control signals from the signals on its input terminals indicating in which format and which location therein the characters of said sequences are being received;

second, third, and fourth state machine means each of which is coupled to receive respective subsets of said control signals from said first state machine means;

said second, third, and fourth state machine means being adapted to perform respective read and write operations on said voice characters and said data characters in response to the subset of control signals it receives, and each subset of said control signals being substantially smaller in number than said input terminals of said logic array.

2. A circuit according to claim 1 wherein said second state machine means includes a means for reading a single voice character from and writing a single voice character to respective selectable locations in said multiformatted sequences.

3. A circuit according to claim 1 wherein said third state machine means includes a means for reading a block of data characters from consecutive locations in said multiformatted sequences.

4. A circuit according to claim 1 wherein said fourth state machine means includes a means for writing a block of data characters to consecutive locations in said multiformatted sequences.

5. A circuit according to claim 1 wherein the total number of input terminals to said logic array times three, minus the total number of control signals in all of said subsets is more than the number of input terminals of said logic array.

6. A circuit which operates on input signals representing sequences of idle characters, voice characters, and data characters; each of said characters being defined by a state of said input signals when a clock occurs; said sequences having a format that establishes where said characters are located in said sequences; and said logic circuit comprising:

a first state machine means for receiving said input signals, and in response, for generating control signals indicating when said voice characters are being received and when said data characters are being received;

a second state machine means coupled to said first state machine for receiving one subset of said control signals and in response thereto for reading a single voice character from and writing a single voice character to respective selectable locations in said format;

a third state machine means coupled to said first state machine for receiving another subset of said control signals and in response thereto for reading a block of data characters from one set of consecutive locations in said format;

a fourth state machine means coupled to said first state machine for receiving still another subset of said control signals and in response thereto for writing a block of data characters into said set of consecutive locations in said format;

said first state machine comprising a register which receives said input signals in synchronization with said clock, a logic array, and a counter;

said logic array having input terminals coupled to receive signals from said register and counter in parallel, having output terminals coupled back to said register, and being adapted to generate said control signals; and said input terminals of said logic array being larger in number than each subset of said control signals which said second, third, and fourth state machines respectively receive from said first state machine.

7. A circuit according to claim 6 wherein each of said subsets of control signals which said second, third, and fourth state machines receive contains a common group of state signals which identify where in said input signals a character is being received.

8. A circuit according to claim 7 wherein:

one section of said register is coupled to receive said input signals from an external source;

another section of said register is coupled to receive said state signals; and said counter is coupled to receive a signal from said logic array which initializes its operation.

9. A circuit according to claim 8 wherein:

said counter generates an end signal when a predetermined count is reached, and wherein said state signals are generated by said logic array in accordance with the logic equations of:

if idle character present, go to state one; otherwise
if present state=one, go to state two,
if present state=two, go to state three and reset counter,
if present state=three, go to state four,
if (present state=four)(end=0), stay in state four,
if (present state=four)(end=1), go to state five and reset counter,
if present state=five, go to state six,
if (present state=six)(end=0), stay in state six.

10. A circuit according to claim 9 wherein said second, third, and fourth state machine means each consist essentially of a register for receiving a subset and said control signals, a logic array coupled to receive signals from said register, and a means for coupling output signals from the logic array back to said register.

11. A circuit according to claim 10 wherein said first, second, third, and fourth state machines are all integrated on a single semiconductor chip.

* * * * *